United States Patent [19]

Cornacchia

[11] Patent Number: 4,597,707
[45] Date of Patent: Jul. 1, 1986

[54] AUTOMATIC OPERATING PALLETIZER
[75] Inventor: Vincent Cornacchia, Paramus, N.J.
[73] Assignee: General Machine Design, Inc., Palisades Park, N.J.
[21] Appl. No.: 642,032
[22] Filed: Aug. 17, 1984
[51] Int. Cl.$^4$ ............................................. B65G 57/24
[52] U.S. Cl. ........................................ 414/62; 187/82; 187/94; 414/70; 414/84; 414/902; 901/16
[58] Field of Search ......................... 414/57, 62, 70, 71, 414/84, 902; 187/81, 82, 83, 94; 901/14, 16, 48

[56] References Cited

U.S. PATENT DOCUMENTS

| | | | |
|---|---|---|---|
| 1,566,491 | 12/1925 | Lindquist | 187/94 X |
| 2,238,963 | 4/1941 | Bayer | 187/82 |
| 2,897,920 | 8/1959 | Falter et al. | 187/94 X |
| 3,612,221 | 10/1971 | Branham | 187/82 X |
| 3,709,379 | 1/1973 | Kaufeldt | 901/16 X |
| 3,884,363 | 5/1975 | Ajlouny | 414/71 X |
| 3,888,362 | 6/1975 | Fletcher et al. | 414/626 X |
| 4,005,782 | 2/1977 | Crockett | 901/16 X |
| 4,132,318 | 1/1979 | Wang et al. | 901/16 X |
| 4,242,025 | 12/1980 | Thibault | 414/70 |
| 4,383,788 | 5/1983 | Sylvander | 414/71 |

FOREIGN PATENT DOCUMENTS

| | | | |
|---|---|---|---|
| 2620535 | 11/1977 | Fed. Rep. of Germany | 414/62 |
| 2454987 | 12/1980 | France | 414/71 |

OTHER PUBLICATIONS

Robot Case Palletizer brochure, Model 250, FMC Corporation, Hoopeston, Ill. copyright 1984.

Primary Examiner—Leslie J. Paperner
Attorney, Agent, or Firm—Fred A. Keire

[57] ABSTRACT

An automatically operating palletizer is disclosed which included a vertical support column, a horizontally positioned support beam, and means for movably mounting the horizontal support beam on the support column for vertical movement relative to the support column. A horizontally extending product beam is movably mounted on the horizontal support beam and extends perpendicularly thereto. A product carrier is slidably mounted on the product support beam for movement along its length. Drive means are provided to drive the horizontal support beam and the product support beam to a plurality of vertical and horizontal positions relative to the support column, and also to drive the product carrier along the support beam. As a result the product carrier is positioned at any of a plurality of predetermined positions in a three dimensional volume to move products from one position, e.g. a pickup station, to any of a plurality of other predetermined positions. The support column and various beams of the palletizer are formed of light weight stainless steel.

17 Claims, 12 Drawing Figures

AUTOMATIC OPERATING PALLETIZER

The present invention relates to package palletizers and, more particularly, to an automatically operating palletizer.

When a manufacturer desires to palletize packages from his product finishing line, individual packaged cartons are typically manually removed from the end of the packaging line and stacked on a pallet. This manual stacking is normally performed so that the packages are arranged in a predetermined pattern on the pallet in order to interlock and form a stable solid bulk of packages. Thus the completed pallet can be safely and easily moved from one position to another, for example, for placement on a truck or the like, for shipment.

Heretofore attempts have been made to create automatic palletizing machines to remove packages from a packaging line and place them automatically on a pallet. Such devices as have been previously proposed are relatively complex, large and bulky. They are also difficult to operate and have high power requirements. Many previously proposed automatic palletizers have fixed stacking patterns and thus their use is limited. Other previously proposed palletizers use microprocessors that can be programmed to vary the automatic operating pattern for the device. However, the processing capabilities of the prior art devices are relatively limited and modifications in the programmed stacking or palletizing pattern are difficult to make. In addition, these devices, because of their size and complexity, are relatively expensive.

It is an object of the present invention to provide an automatically operating palletizing device which is relatively simple in construction and economical to operate.

Another object of the present invention is to provide a light weight automatically operating palletizer which is relatively simple to operate and to "teach" patterns.

A further object of the present invention is to provide an automatically operating palletizer which will move individual packages from one pickup plurality to a plurality of predetermined positions in space in accordance with a desired palletizing pattern, using a minimum of movement.

Yet another object of the present invention is to provide an automatically operating palletizer which is simple in construction, durable in operation and faster in its plurality placement cycles.

In accordance with an aspect of the present invention, an automatically operating palletizer is provided which consists of a support frame and an independent, fixed and stationary vertical support column formed of lightweight stainless steel members. In particular, the column is formed of six generally rectangular hollow beams that are welded together to form an integral structure having a relatively square outline. This structure has exceedingly high strength, despite its lightweight construction, because of the plurality of internal webs formed by the beam elements therein giving the column a honeycombed type structure. A first horizontal support beam is slidably mounted on the vertical support column and a second horizontal beam, referred to hereinafter as the product support beam and extends perpendicularly thereto. The product support beam is mounted to slide relative to the horizontal support beam and moves witn the horizontal support beam in a vertical direction relative to the support column.

A product carrier and/or pickup head is slidably mounted on the product support beam for movement along its length.

Drive means are provided on the support column, the horizontal support beam, and the product support beam for moving the horizontal support beam, product support beam, and carrier through multiple positions so that the carrier can move from a variable pickup position to any of a plurality of other positions within a predetermined three dimensional volume in order to stack packages on a pallet or the like.

The palletizer of the invention, being formed of lightweight stainless steel, has multiple advantages. For example, it can be used in humid areas and for food handling, whereas previously proposed systems cannot be used in this way. In addition, because of its lightweight the device has relatively low maintenance and requires no painting. It is formed in a relatively compact construction and thereby requires low power for operation. Indeed, the device of the invention will have a power consumption of no more than 1200 watts, 110 volts, making it the lowest power consuming palletizer presently on the market. This results from the fact that smaller motors can be used to operate the device as compared to the prior art structures. Such low current requirements also make the device safe for humans to operate, since the current supply is insufficient to cause serious harm in the event of an accident.

The above and other objects and features and advantages of this invention will be apparent in the following detailed description of an illustrative embodiment thereof, which is to be read in connection with the accompanying drawings, wherein.

Figure 1:
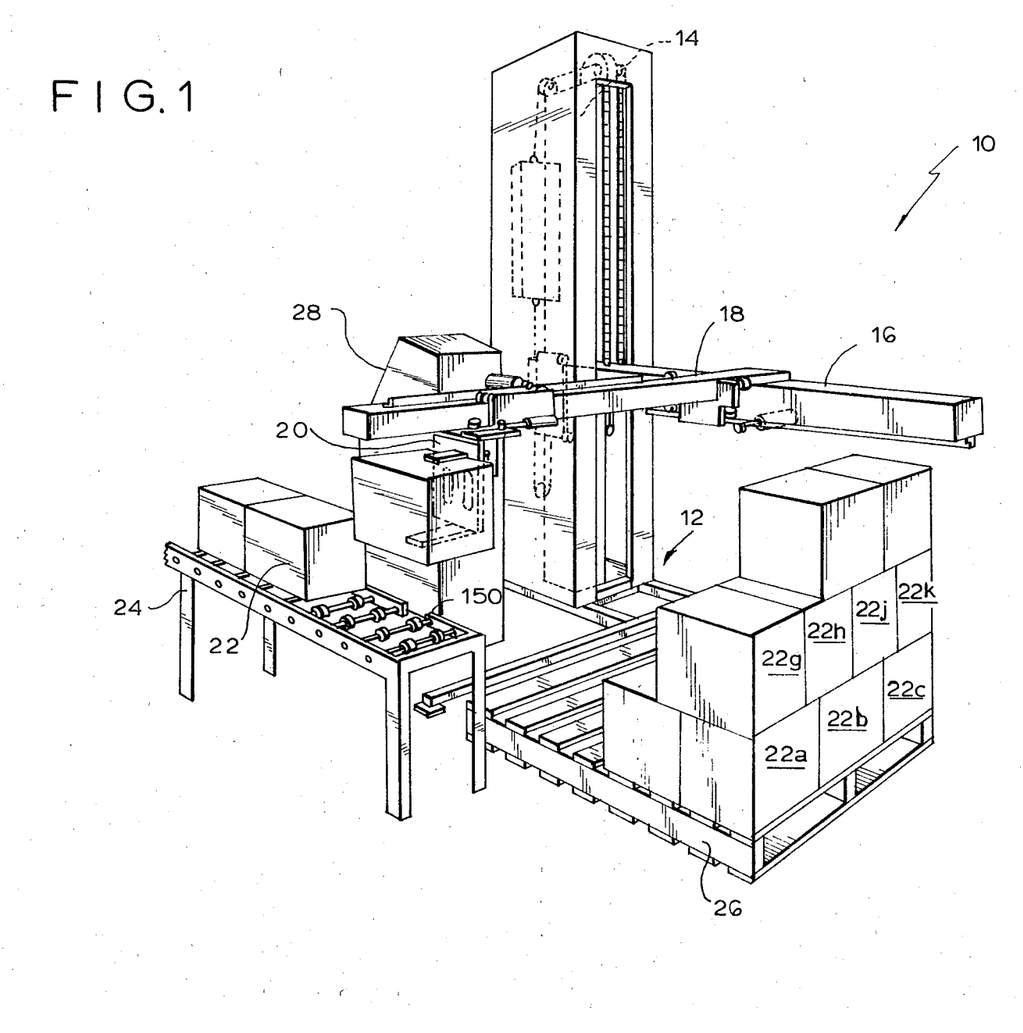
FIG. 1 is a perspective view of an automatically operating palletizer constructed in accordance with the present invention.

Referring now to the drawing in detail, and initially to FIG. 1 thereof, an automatically operating palletizer 10 constructed in accordance with the present invention is illustrated. The palletizer includes a support frame 12 having an independent, fixed and stationary vertical support column 14 on which a horizontally extending support beam 16 is slidably mounted for vertical movement. A product support beam 18 is slidably mounted on beam 16 and extends perpendicularly to beam 16. The product support beam 18 is adapted to be moved, as described hereinafter, along the length of beam 16. A product carrier or pick-up head 20 is slidably mounted on product support beam 18 and can be driven along the length of that beam to any of a plurality of predetermined positions.

Pickup head 20 has a clamp arrangement which enables it to pickup individual packages 22 from a conveyor 24 at the end of a product packaging line. The palletizer operates to lift the package from conveyor 24 and move it onto a pallet 26 in accordance with a predetermined and preprogrammed stacking pattern. While cartons 22 are illustrated in the drawing as being stacked, the palletizer can also be used to stack bags, sacks, drums, cans or the like.

The product carrier or pickup head 20 can pivot through 90° from the position shown in FIG. 1, wherein it extends generally parallel to product support beam 18, to a position perpendicular thereto. As a result the packages can be stacked in one of two positions in order to interlock the packages in accordance witn common palletizing procedures. By using a larger ram 112, described hereinafter, having a larger rod, head 20 can be made to pivot through 180° if necessary.

Palletizer 10 includes an automatic control system 28 which is preprogrammed, and reprogrammable in order to permit the operator to determine the desired stacking pattern. Preferably the control system is of the computerized numerical control type, such as is commonly used in machine tool centers wherein accurate positioning of tools in three dimensions is required. The programming, therefore, is modified for this specific application, but the specific programming of these controls does not form any part of this invention and would be within the skill of those in the art of computerized numerical control systems. However, applicant is the first to conceive of the use of computerized numerical control systems for palletizing arrangements.

Figure 2:
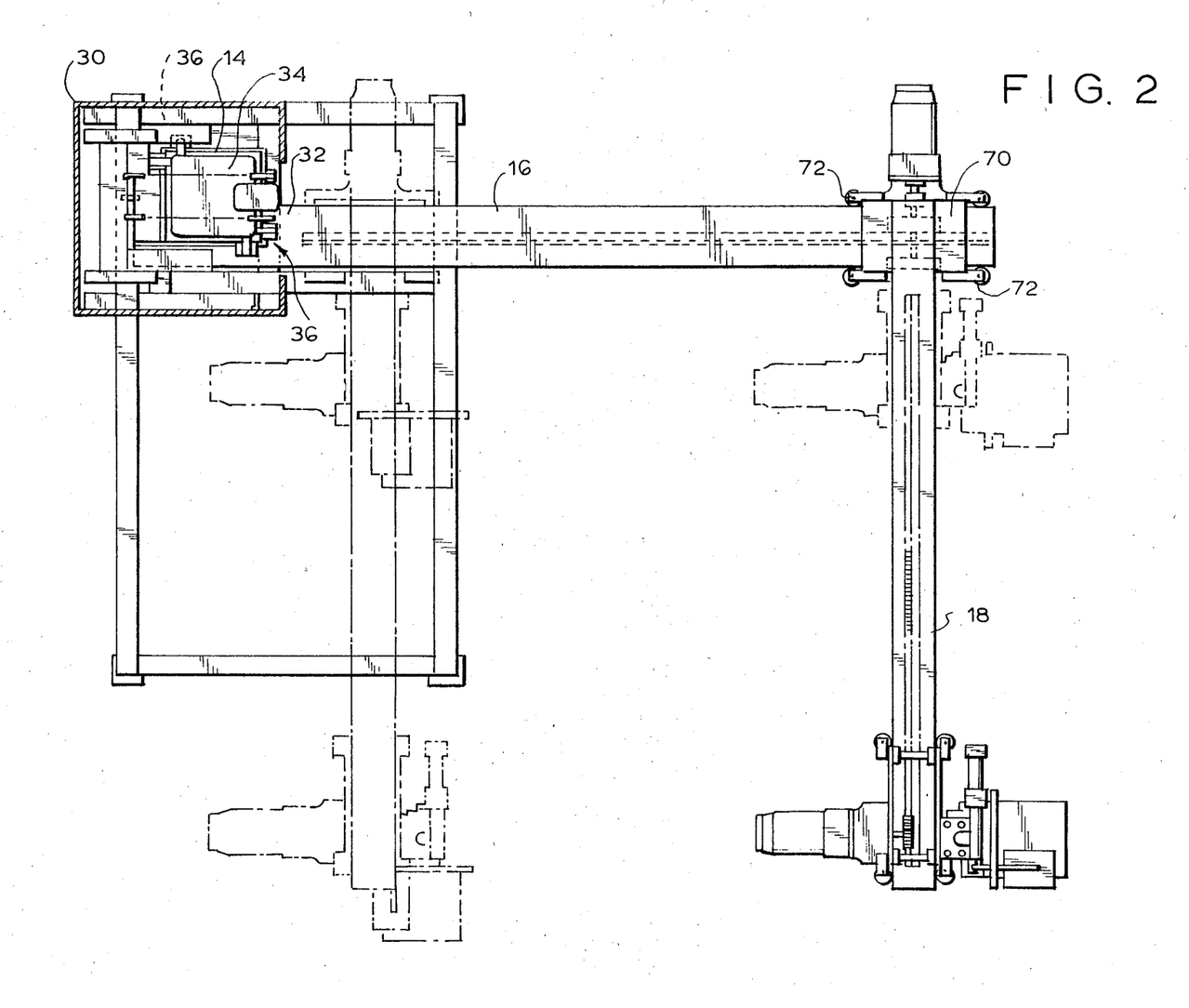
FIG. 2 is a top plan view of the palletizer shown in FIG. 1.
Figure 3:
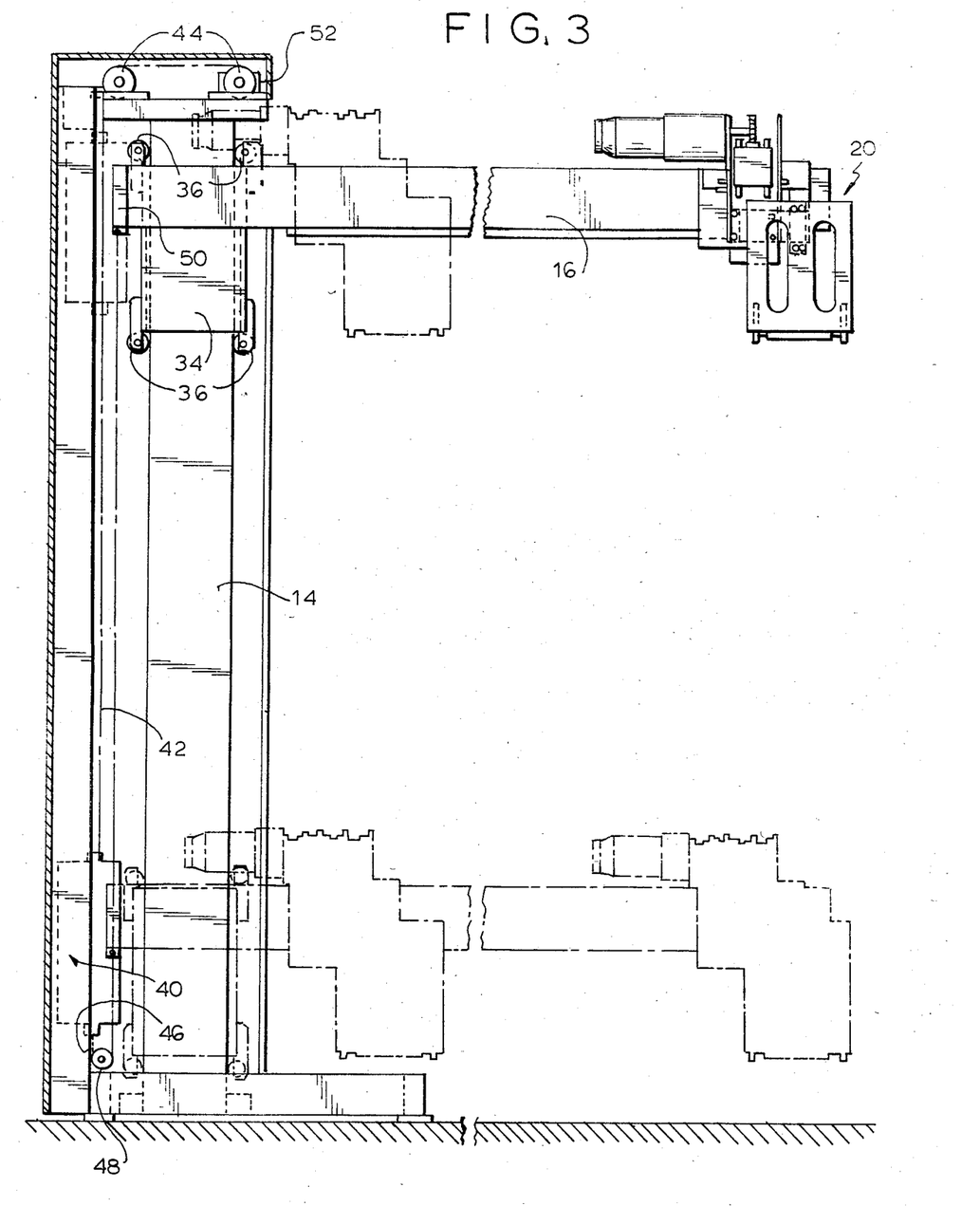
FIG. 3 is a side elevational view of the palletizer.
Figure 6:
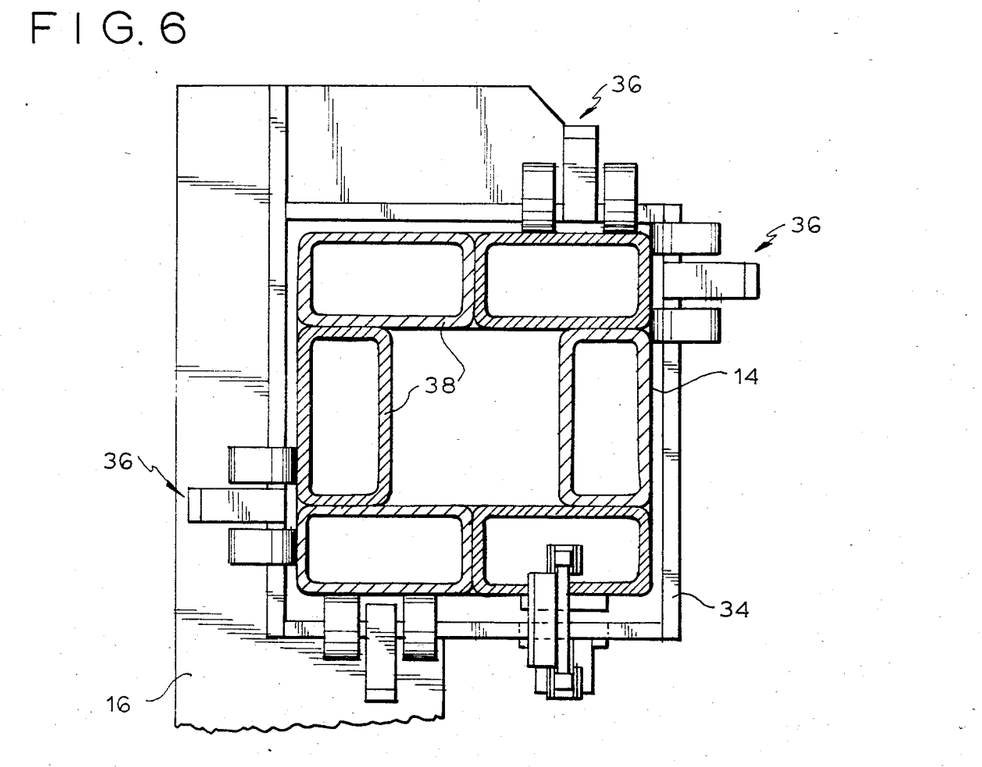
FIG. 6 is a sectional view taken along line 6—6 of FIG. 5.

Referring now to FIGS. 2 and 3, palletizer support column 14 is housed within an outer casing 30 which shields the various moving parts for driving the horizontal support beam 16 in a vertical direction. Beam 16 has an inner end 32 which is mounted on, and rigidly secured to, a generally square carriage or sleeve 34 which is slidably mounted on support column 14. Preferably, the carriage has a series of roller bearing structures 36 at two diagonally opposed corners which permit the carriage to roll vertically on the outer surface of column 14. These rollers are arranged on at least two of the diagonally opposed corners, of the carriage as shown in FIG. 6, which will bear the weight of the cantilevered beam 16. However, the roller can be located in each of its four corners.

As seen in FIG. 6, column 14 is actually formed of six rectangular beams or tubes 38. Preferably these beams are two-by-four stainless steel beams welded together at spaced locations along their length in the pattern illustrated in FIG. 6 to provide support column 14 with a square outer periphery. This configuration of the individual two-by-four stainless steel beams provides a relatively rigid high strength column, even though lightweight stainless steel is used. This is the result of the numerous internal webs formed in the column by these hollow beams providing the column with a form of "honeycomb" internal reinforcing structure.

Figure 5:
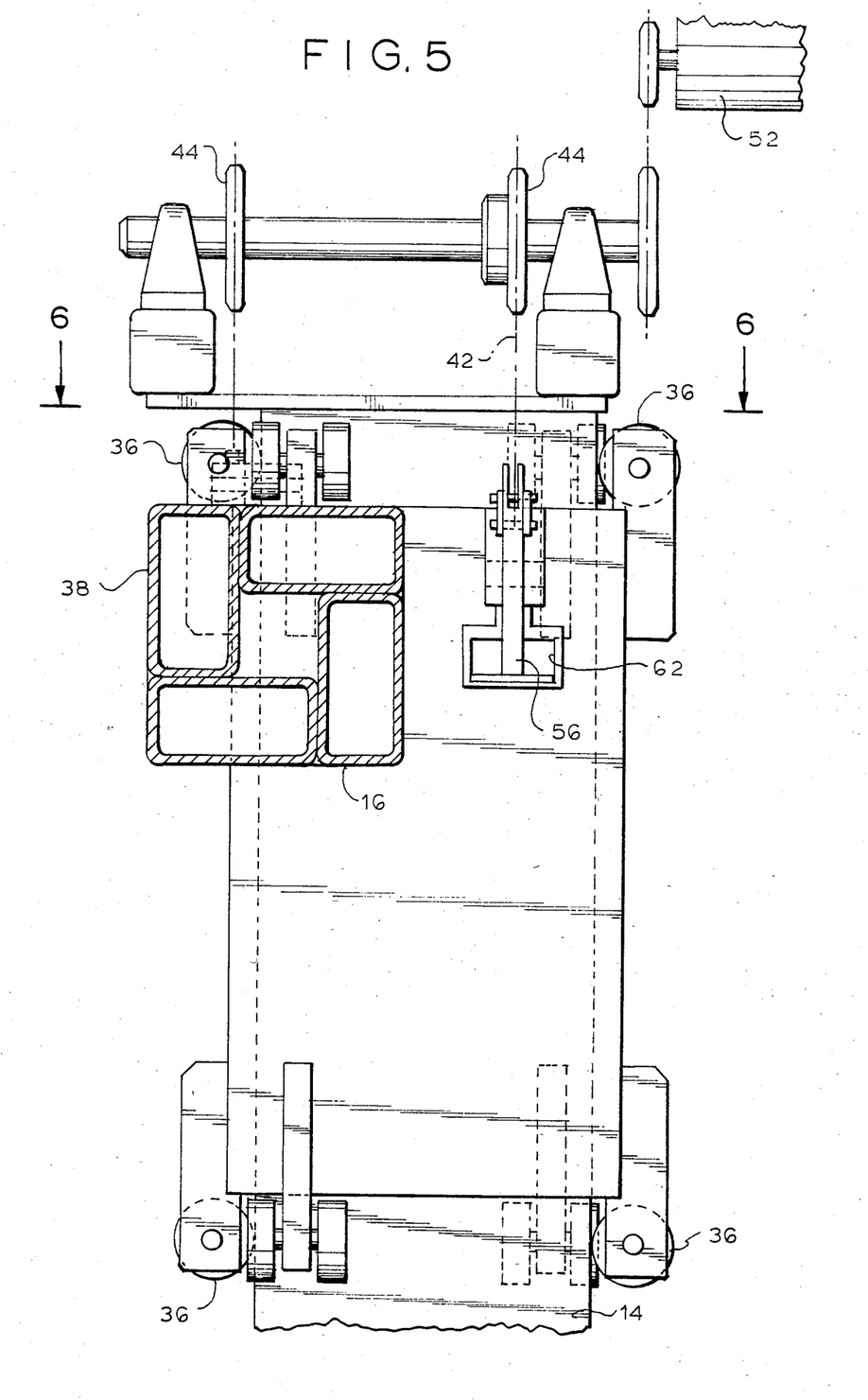
FIG. 5 is a sectional view taken along line 5—5 of FIG. 4.

The carriage 34 is moved vertically relative to column 14 by a chain drive system which includes a counterweight 40 for balancing the weight of support beam 16 and the other structures mounted thereon with respect to the center line of the column. Counterweight 40 is connected by a first pair of drive chains 42, which pass from the top of the counterweight over a pair of sprockets 44, to points of connection on carriage 34. An additional drive chain 46 is connected between the lower end of the counterweight 40, over a lower pair of sprockets 48 on frame 12, to the back end 50 of the support beam 16 or carriage 34. This double chain arrangement provides a closed loop drive for the support beam so that the drive to the beam is balanced and the beam remains in a horizontal position during movement on the support column. The chains 42 are driven by a motor 52 mounted on the top of column 14 and connected to one of the pairs of sprockets 44 as seen in FIG. 5.

The connection of at least one of the chains 42 to carriage 34 is through a brake latch arrangement 54 which assures that the horizontal support beam will be stopped in a position spaced above the floor in the event chains 42 should break. The other chain is connected directly to carriage 34, although it could also be connected through an identical brake lock.

Figure 4:
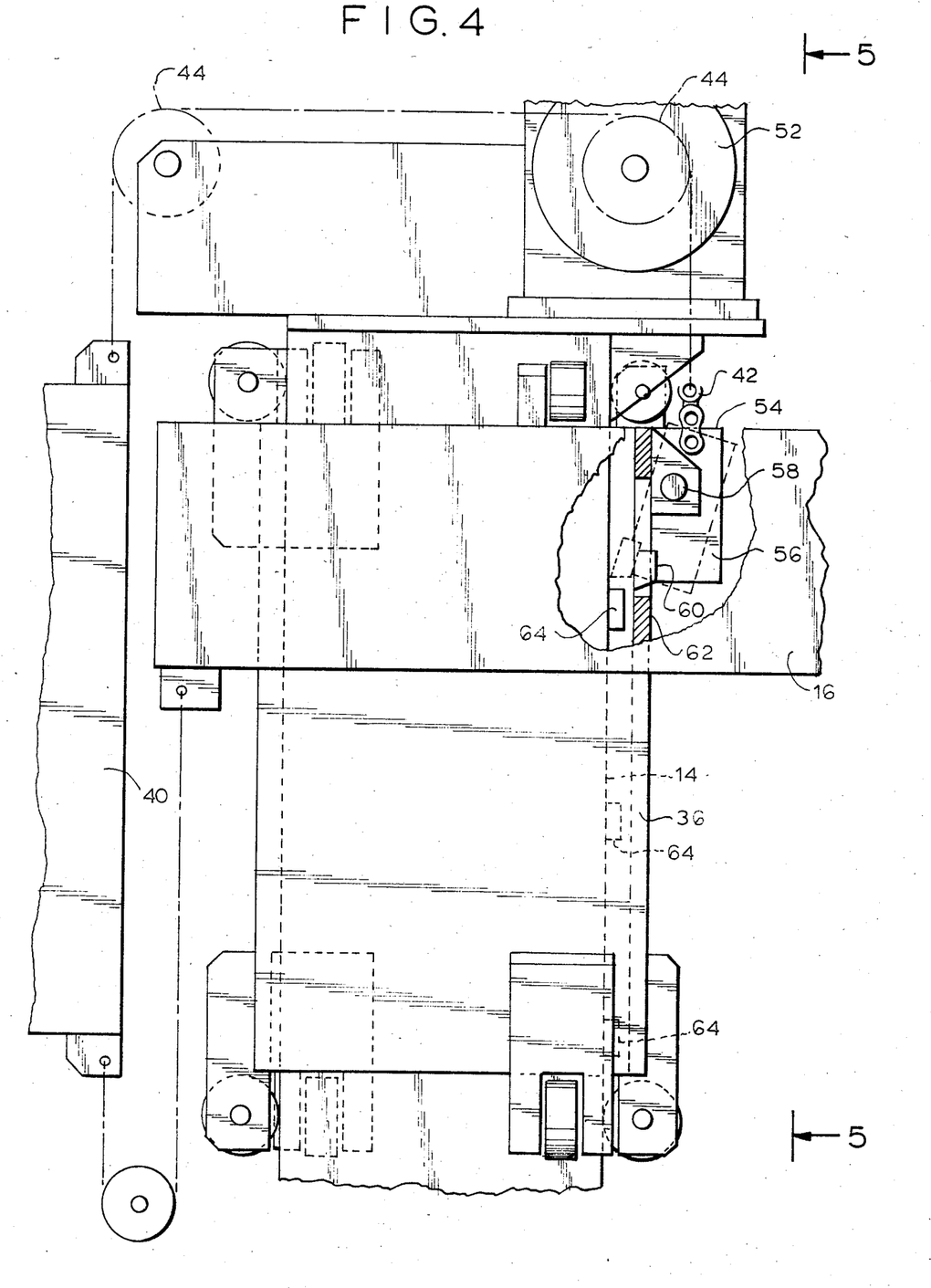
FIG. 4 is an enlarged side view of the mounting carriage for the horizontal support beam on the vertical support column of the device.

Brake lock 54 includes a latch 56 pivotally mounted by a pivot pin 58 on the side of carriage 14, adjacent beam 16. The lower end of latch 56 includes a stop toe 60 which is adapted to pass through an opening 62 formed in carriage 36.

Latch 56 is weighted such that when the tension on chains 42 is relieved, the latch will automaticaly pivot from the solid line position illustrated in FIG. 4 to the dotted line position, to move toe 60 closer to column 14. The latter has, on the side thereof opposite counterweight 40, a series of bars or stops 64 (only three of which are shown in FIG. 4) secured thereto and positioned to engage toe 60 should latch 56 move into the dotted line position of FIG. 4. By this arrangement, should chain 42 break thereby freeing support beam 16 to fall downwardly along column 14, latch 56 will automatically pivot into its dotted line position and stop this downward movement by causing engagement of toe 60 against one of the stop bars 64. This arrangement thus provides a safety device which will prevent injury to anyone working about the palletizer in the event the operating chains should break. The motor 52 which drives chains 42 is an electric motor having a low power consumption requirement. It is under the control of the computerized numerical control system 28 so that the column 16 is accurately moved vertically in space by the motor to any one of a multiplicity of positions between the two extreme upper and lower positions shown respectively in dotted and solid lines in FIG. 3.

Figure 8:
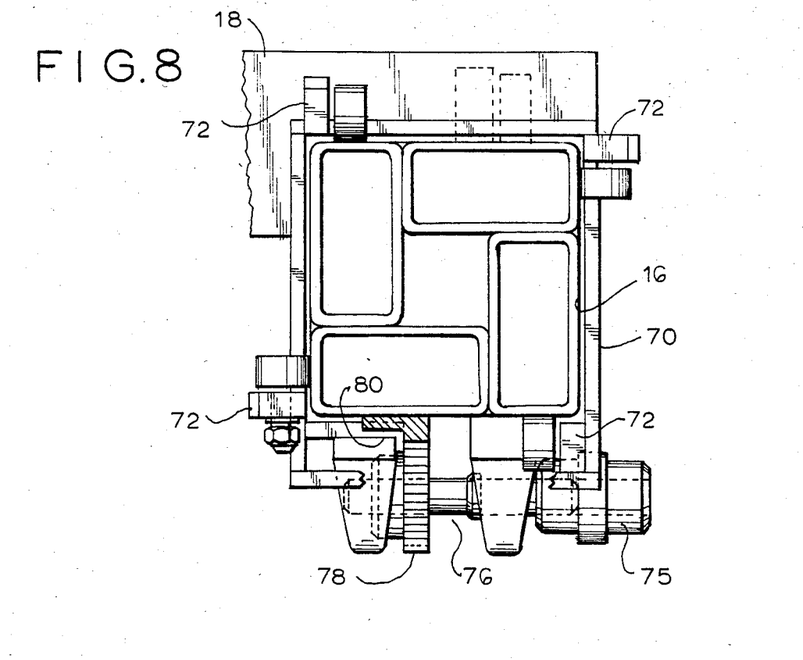
FIG. 8 is a sectional view taken along line 8—8 of FIG. 9.

Product support beam 18 is slidably mounted on the horizontal support beam 16 by a carriage 70 rigidly secured, by welding or the like, to beam 18. This carriage is a generally square sleeve having a plurality of guide roller structures 72 located at its four corners to permit the carriage to roll along the surface of the support beam. The horizontal support beam, 16, as seen in FIG. 5, is formed of four rectangular two-by-four stainless steel beams 38, of the same size and construction as the beams 38 which form the vertical column. In this case, the four beams are arrayed as shown in FIG. 8 to form a generally square periphery for support beam 16. Again, because of the plurality of the internal webs formed by this construction, the beam will have substantial strength although formed of lightweight stainless steel.

Figure 7:
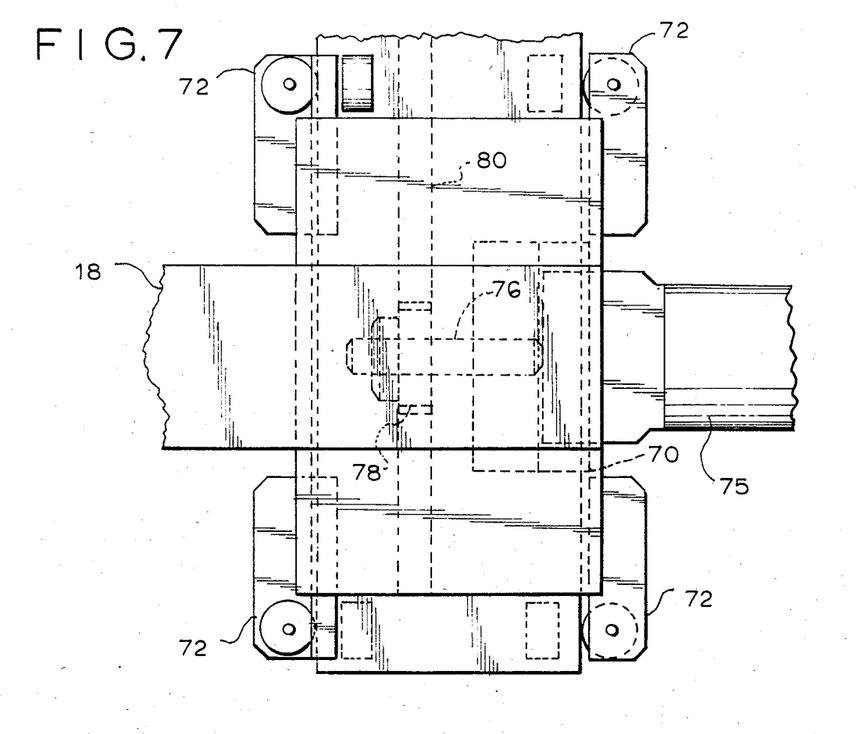
FIG. 7 is a top plan view of the mounting carriage for the product support beam on the horizontal support beam.
Figure 11:
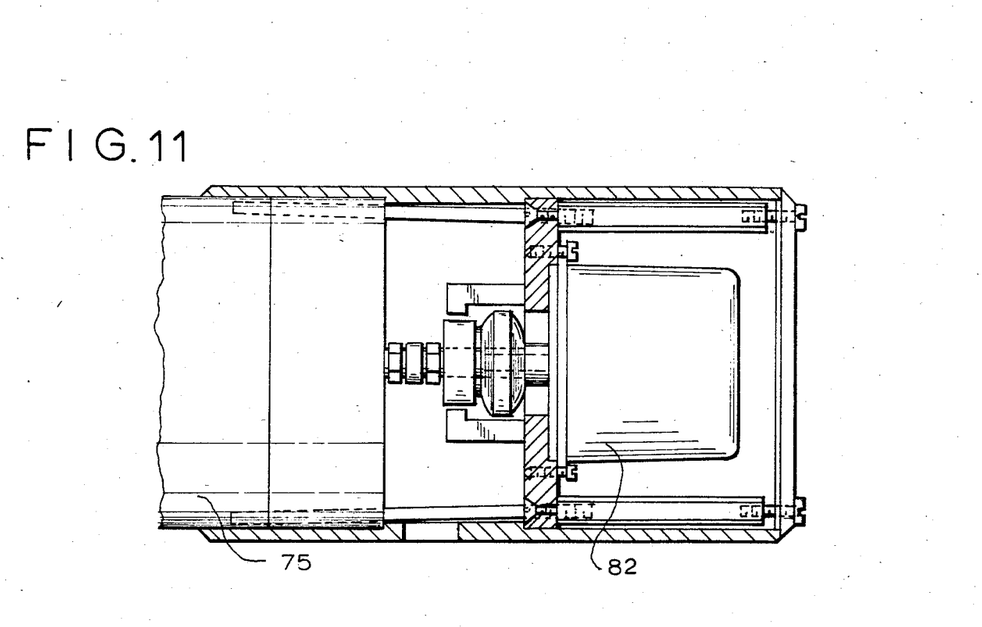
FIG. 11 is a sectional view of one of the motor assemblies, for example used to drive the product support beam on the horizontal support beam.

As seen in FIGS. 7 and 8, product support beam 18 is securely mounted on the upper side of carriage 70. The carriage is driven along the length of horizontal support beam 16 by an electric motor 75 which is mounted on carriage 70 in any convenient manner. The driveshaft 76 of motor 75 has a pinion 78 splined thereto. This pinion is in driving engagement with a longitudinally extending rack 80 rigidly secured to the lower surface of support beam 16. When operated, motor 75 will turn pinion 78 against rack 80 and cause the carriage to slide or roll along support beam 16. This motor, as seen in FIG. 11, has an optical encoder 82 associated therewith, as does the drive motor 52 and the drive motor for the carriage mounting the carrier on the product support beam 18. The optical encoder is of conventional known construction, and serves to provide a continuous signal to the computerized numerical control system 28 thus advising that system of the precise location in space at which the member it is driving is located. In this way the control system can control operation of the motor 75 (and the other electric motors in the palletizer) to precisely locate the carrier or pickup head 20 to pick up a package 22 from conveyor 24 and move it to the desired location in space at which it is deposited on pallet 26.

Figure 9:
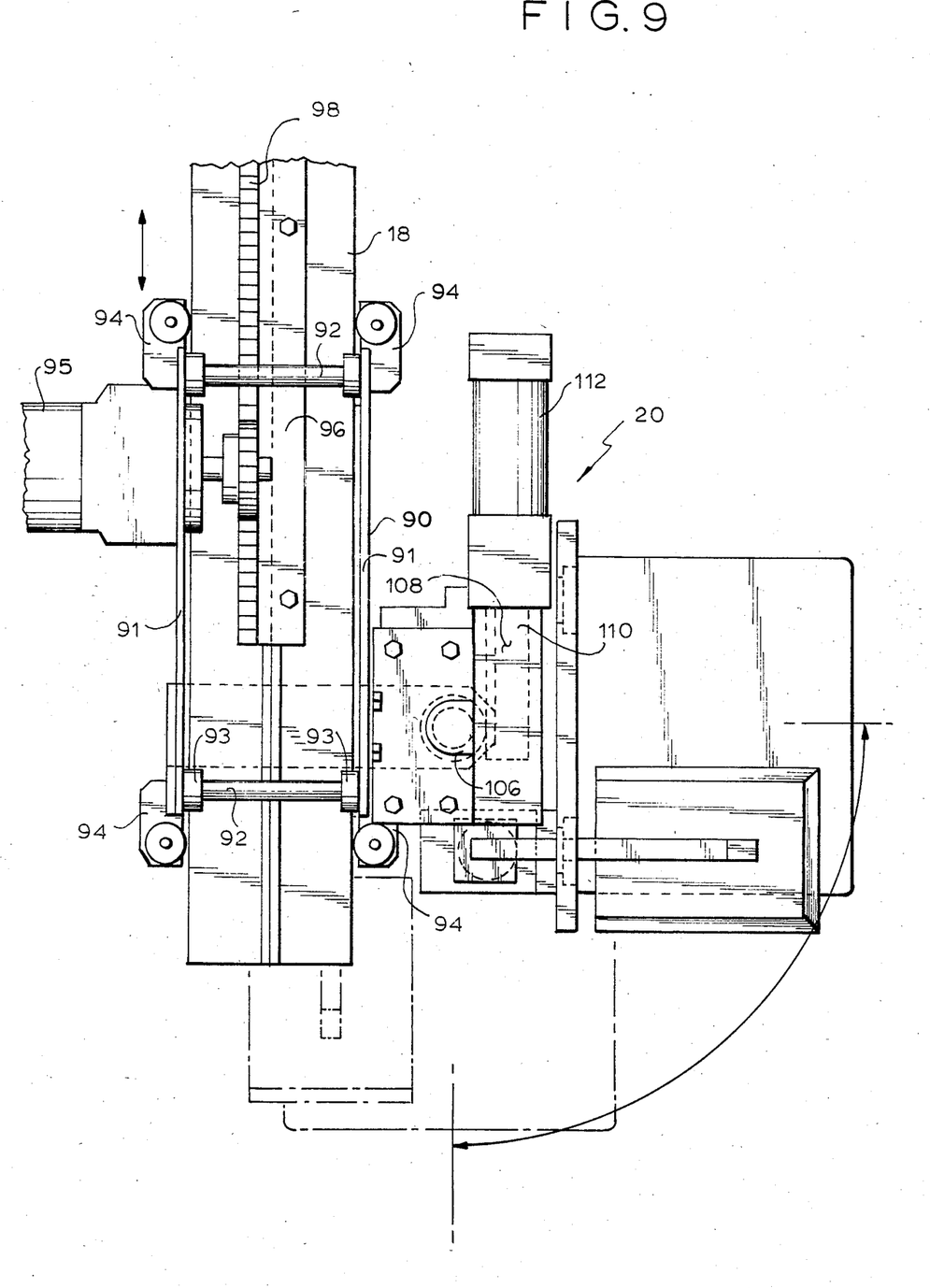
FIG. 9 is a top plan view of the carriage arrangement for the product carrier on the product support beam.
Figures 10, 10A:
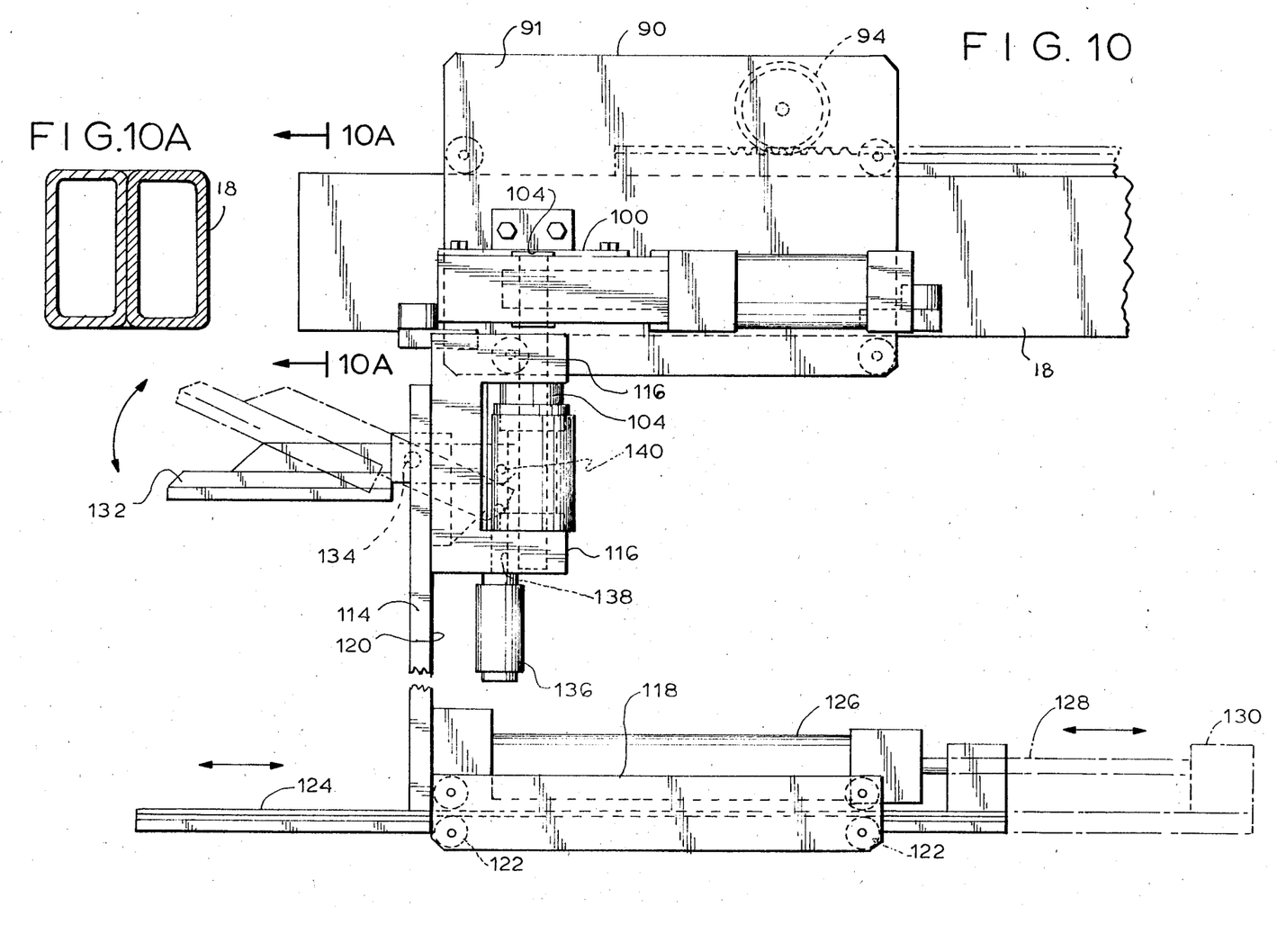
FIG. 10 is a side view of the carriage arrangement shown in FIG. 9, but with the carrier platform moved 90° into the dotted line position shown in FIG. 9.
FIG. 10a is a sectional view of the product support beam taken along line 10a—10a of FIG. 10.

Referring now to FIGS. 9 and 10, the pick up head or carrier 20 is illustrated in greater detail. As seen therein, head 20 is mounted on a carriage 90 formed of two side plates 91 connected by cross bars 92 which have rollers 93 mounted thereon. Additional roller units 94 located at each corners of carriage 90 aid in slidably mounting the carriage on product support beam 18. As in the other carriages previously described, these roller systems form pairs of right angularly arranged rollers which bear against and roll along the surfaces of beam 18.

As seen in FIG. 10A, beam 18 is formed of two two-by-four hollow stainless steel arranged to define a square, albeit smaller, exterior profile for beam 18 as compared to beam 16 and the column 14. If desired, separate wear strips (not shown) can be secured to the surfaces of the stainless steel beams and column for engagement by the rollers of the roller assemblies to increase the wearlife thereof.

Carriage 90 is driven along the length of beam 18 by a motor 95 similar to the motor 75 previously described. Motor 95 is associated with an optical encoder, as discussed above, and drives a pinion 96 engaged with a rack 98 secured to the upper surface of product support beam 18 and extending there along. By this arrangement, operation of motor 95 will cause carriage 90 to slide or roll along beam 18 and carry with it the carrier or pick up head 20.

A pivot housing 100 is rigidly secured to one of the side plates 91 of carriage 90 for rotatably mounting the pick-up head 20 on the carriage. A pivot pin 104 is rotatably mounted in housing 100 in any convenient, known manner. This pivot pin has a sector gear 106 secured thereto and engaged with a rack 108 formed on the rod 110 of an air cylinder 112. The casing of cylinder 112 is secured to housing 100 in any convenient manner. By this arrangment, when air pressure is applied to cylinder 112, the rod 110 turns sector gear 106 and causes head 20 to move from the solid line position shown in FIG. 9 to the dotted line position shown therein. It is noted that the position of the head 20 in FIG. 10 corresponds to the dotted line position of the head in FIG. 9.

Head 20 includes a vertical stop plate 114 which is secured by a bracket 116 or the like to the pivot pin 104 so that plate 114 moves with pin 104 upon actuation of the ram 112. A support frame 118 is rigidly mounted on the rear 120 of plate 114 in any convenient manner and has two sets of spaced rollers 122 mounted therein. A package support plate 124 is mounted between the rollers 122, as seen in FIG. 10, and can be moved from an extended position (shown in solid lines in FIG. 10) to a retracted position (shown in dotted lines in FIG. 10), upon the actuation of an air ram 126. The latter is rigidly mounted on frame 118 and has a piston rod 128 secured through a boss 130 or the like to plate 124. Actuation of the ram 126 will cause the plate 124 to retract as shown in FIG. 10. This ram is also under the control of system 28.

In addition to plate 124, a clamp element 132 is pivotally mounted on plate 114 by a pivot pin 134 or the like. Clamp 132 is moved between a clamping position, (shown in solid lines in FIG. 10) and an unclamping position (shown in dotted lines in FIG. 10) by the actuation of an air ram 136 mounted on bracket 116. Ram 136 includes a piston rod 138 which is pivotally connected by a pin 140 or the like to the rear of clamp head 132. When a package is supported on plate 124, ram 136 is actuated to move plate 132 against the package and hold it tightly against plate 124.

In operation, palletizer 10 of the invention is programmed to sequentially pick up an individual package 22 at pick up station 24 and move it to a pre-determined position on pallet 26. The positions from and to which individual packages are moved in sequence are preprogrammed in a predetermined but conveniently variable stacking pattern as is selected by the operator. At the commencement of operation, when the first package 22 arrives at the end of the conveyor 24, beams 16 and 18 are moved to position pick up head 20 adjacent an opening 150 formed in the side of conveyor, as seen in FIG. 1. Motor 94 is then operated to drive the pick up head toward the conveyor, along beam 18, and ram 126 is operated so that the plate 124 is in its extended position. Ram 136 is also operated so that clamp head 132 is in its unclamping position.

Motor 94 moves head 20 into position such that plate 124 enters the opening 150 below the package 22 at the pick up station. When the head is properly positioned, with plate 124 below the package, the ram 136 is operated to clamp the package against the plate 124 as the beam 16 is raised to draw plate 124 against the bottom of the package 22. The motors 94, 75, 52 are then operated to position pick up head 20 with the package clamped thereon above pallet 26 to place the first package (designated 22a in FIG. 1) at one corner of the pallet. When the package is in this position, ram 126 is actuated to retract plate 124 from below the package. Since the package cannot move with the plate 124 because of the presure of plate 114, the package will drop down onto the pallet. Since plate 124 is a relatively thin plate, of one quarter of an inch dimension or the like, the package drops only a very small distance.

After package 22a is removed from head 20 in this way, ram 136 is operated to open the clamp plate 132, now ram 126 is operated to extend plate 124, and head 20 is returned, as described above, by operation of the motors 52, 75 and 94, to the pick up station to reinsert plate 124 in the opening 150 of conveyor 24. The cycle is then repeated, as described above, to remove the package from conveyor 24 and bring it to the next position on the pallet. The computerized numerical control system is programmed such that the next package 22b is positioned next to package 22a and dropped on the pallet as described above with respect to package 22a.

In the illustrative embodiment of the invention, two lower rows of packages are positioned on the pallet before the second row is begun. Once the two lower rows are completed, the next row of packages (labeled 22g, 22h, 22i and 22j) is positioned on the lower row. In this embodiment, however, the packages 22g–22j are turned 90° with respect to the packages of the lower row. To do this, the palletizer operates in the same way as described above, with the exception that during movement of the pick up head from the pick up station to the pallet, the ram 112 is operated to rotate the head 90° before it arrives at the position on the pallet at which the package thereon is to be dropped.

By this arrangement a relatively simple palletizer construction is provided which utilizes a minimum of movements to bring a package from one postion to another. The computerized control system enables a variety of palletizing patterns to be achieved and permits the pickup location to be varied. This system operates rapidly and can palletize, in one embodiment, eight packages per minute whereas conventional previously proposed palletizers can package up to only five packages in that same period of time. In addition, this rapid movement is achieved through the use of a lightweight construction requiring low power consumption and permitting the use of computerized numerical controls that provide accurate placement of the packages on the pallet in a pattern that can be easily modified by unskilled labor. Further, the construction of the machine permits it to be built with little additional height over the desired height of the pallet. For example, the overall height of the unit is only about twelve inches higher than the maximum pallet height designed for. Therefore the unit will fit in a low ceilinged factory and still be able to palletize to maximum desired heights.

Although an illustrative embodiment of the invention has been described herein with reference to the accompanying drawings, it is to be understood that the invention is not limited to that precise embodiment and that various changes and modification may be effected therein, by those skilled in the art, without departing from the scope or spirit of this invention.

What is claimed is:

1. An automatically operating palletizer comprising an independent, fixed and stationary vertical support column; a horizontally positioned support beam, means for movably mounting said horizontal support beam on said support column for vertical movement in a fixed vertical plane relative to said support column; a horizontally extending product support beam; means for movably mounting said product support beam on said horizontal support beam perpendicularly to the horizontal support beam for movement along the length of the horizontal support beam; a product carrier slidably mounted on said product support beam for movement along the length of the support beam; drive means for driving said horizontal support beam and said product support beam to a plurality of vertical and horizontal positions respectively relative to said support column, and means for driving said product carrier along said product support beam; said drive means for driving the product support beam and said means for driving the product carrier each comprising a rack respectively mounted on the horizontal support beam and on the product support beam, pinion means respectively engaged with said racks and first and second electric drive motors for driving the respective pinions thereby to position said product carrier at any of a plurality of predetermined positions in a three dimensional volume to move products from one position to any of a plurality of other positions in space.

2. An automatically operating palletizer as defined in claim 1 wherein said product carrier includes a horizontally extending product support plate and means for mounting said product support plate on the product support beam for pivotal movement between a first horizontal position wherein the support plate extends parallel to the product support beam and a second horizontal position extending perpendicularly thereto.

3. An automatically operating palletizer as defined in claim 2 wherein said means for mounting said product support plate on the product support beam includes a vertical stop plate and means for extending and retracting said support plate horizontally relative to said stop plate.

4. An automatically operating palletizer as defined in claim 3 including clamp means associated with said stop plate for cooperating with the product support plate for holding a product thereon.

5. An automatically operating palletizer as defined in claim 1 wherein said means for movably mounting said horizontal support beam on said support column includes a carriage fixed to the horizontal support beam and slidably mounted on the support column a counterweight, and flexible chain means operatively connected between the counterweight and carriage; said drive means including means for driving said chain in opposite directions to selectively move said horizontal support beam upwardly or downwardly.

6. An automatically operating palletizer as defined in claim 5 including automatic brake means for stopping downward movement of said carriage in the event that said chain breaks.

7. An automatic operating palletizer as defined in claim 6 wherein said automatic brake means comprise a latch pivotally mounted on said carriage and pivotally connected to said chain, the pivotal mounting of the latch being located such that removal of tension on the chain causes lower end of the latch to pivot towards the column, said column having a number of stop bars secured thereto for engaging said lower end of the latch and cooperating therewith to prevent downward movement of the carriage.

8. An automatic operating palletizer as defined in claim 7 wherein said column is formed of six rectangular hollow beams arranged to form a square periphery for the column and a plurality of internal webs.

9. An automatic operating palletizer as defined in claim 8 wherein said rectangular hollow beams are formed of stainless steel.

10. An automatically operating palletizer as defined in claim 1 including optical encoding means for the motors to detect the instantaneous positions of said product support beam and product carrier.

11. An automatically operating palletizer as defined in claim 1 wherein said drive means for the product support beam includes a carriage slidably mounted on the horizontal support beam with the first motor mounted along the carrier.

12. An automatically operating palletizer as defined in claim 11 including optical encoding means for the first motor to detect the instantaneous position of the product support beam relative to the horizontal support beam.

13. An automatically operating palletizer as defined in claim 11 wherein said horizontal support beam is formed of four hollow rectangular beams arranged to define a square periphery for the horizontal support beam.

14. An automatically operating palletizer as defined in claim 13 wherein said rectangular beams are formed of stainless steel.

15. An automatically operating palletizer as defined in claim 1 wherein said means for driving the product carrier along the product support beam includes a carriage slidably mounted on said product support beam and having said product carrier mounted thereon; with the second electric motor mounted on the carriage.

16. An automatically operating palletizer as defined in claim 15 including optical encoding means for the motor to detect the instantaneous position of the product carrier relative to the product support beam.

17. An automatically operating palletizer as defined in claim 1 wherein said first motor being fixed relative to said product support beam to provide translational movement of said product support beam along the axis of said horizontal support beam and said second motor being fixed relative to said product carrier to provide translational movement of said product carrier along the axis of said product support beam.

* * * * *